G. M. CLAGETT.
SHOCK CONVEYING MACHINE.
APPLICATION FILED MAR. 31, 1910.
970,304.
Patented Sept. 13, 1910.
2 SHEETS—SHEET 1.
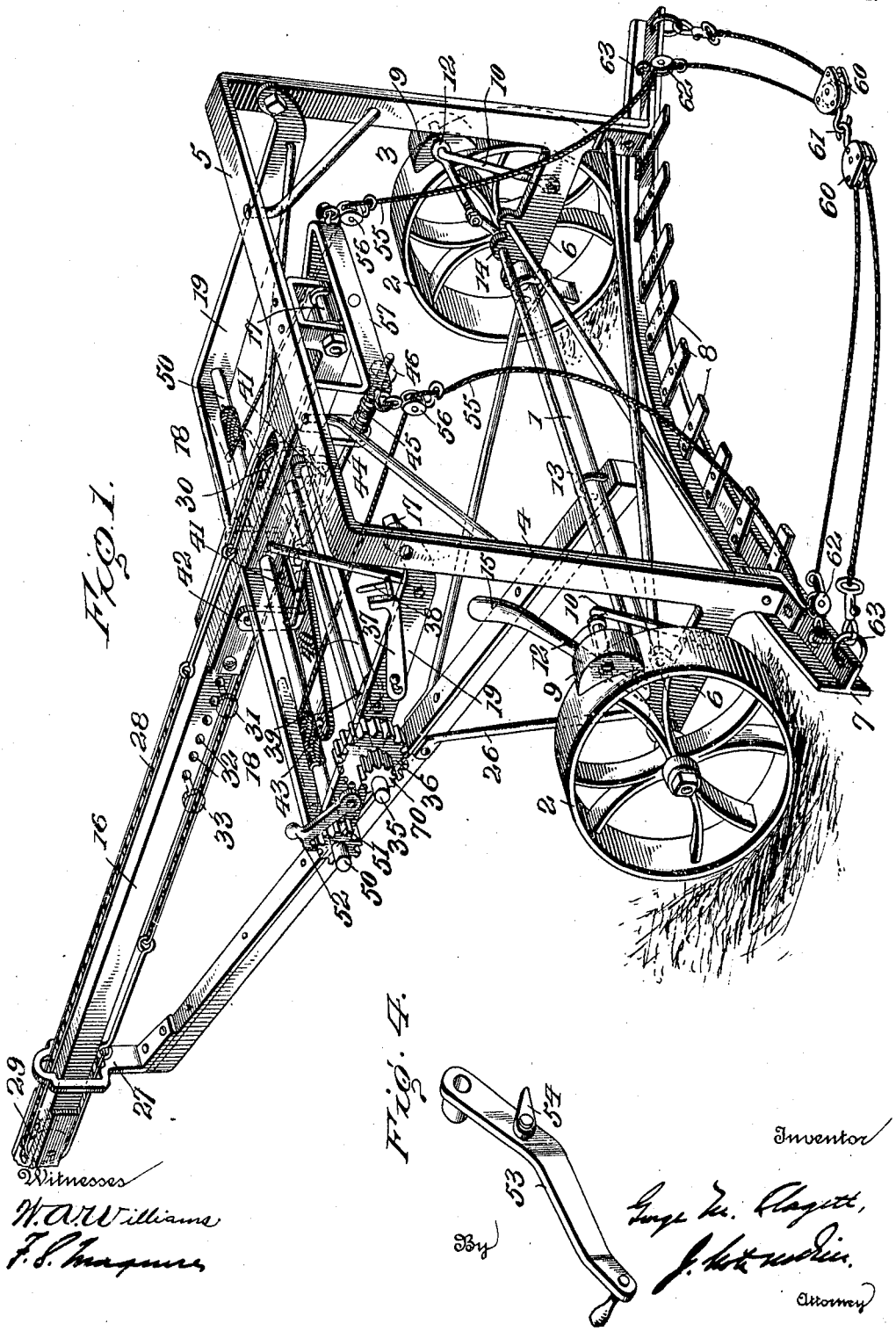

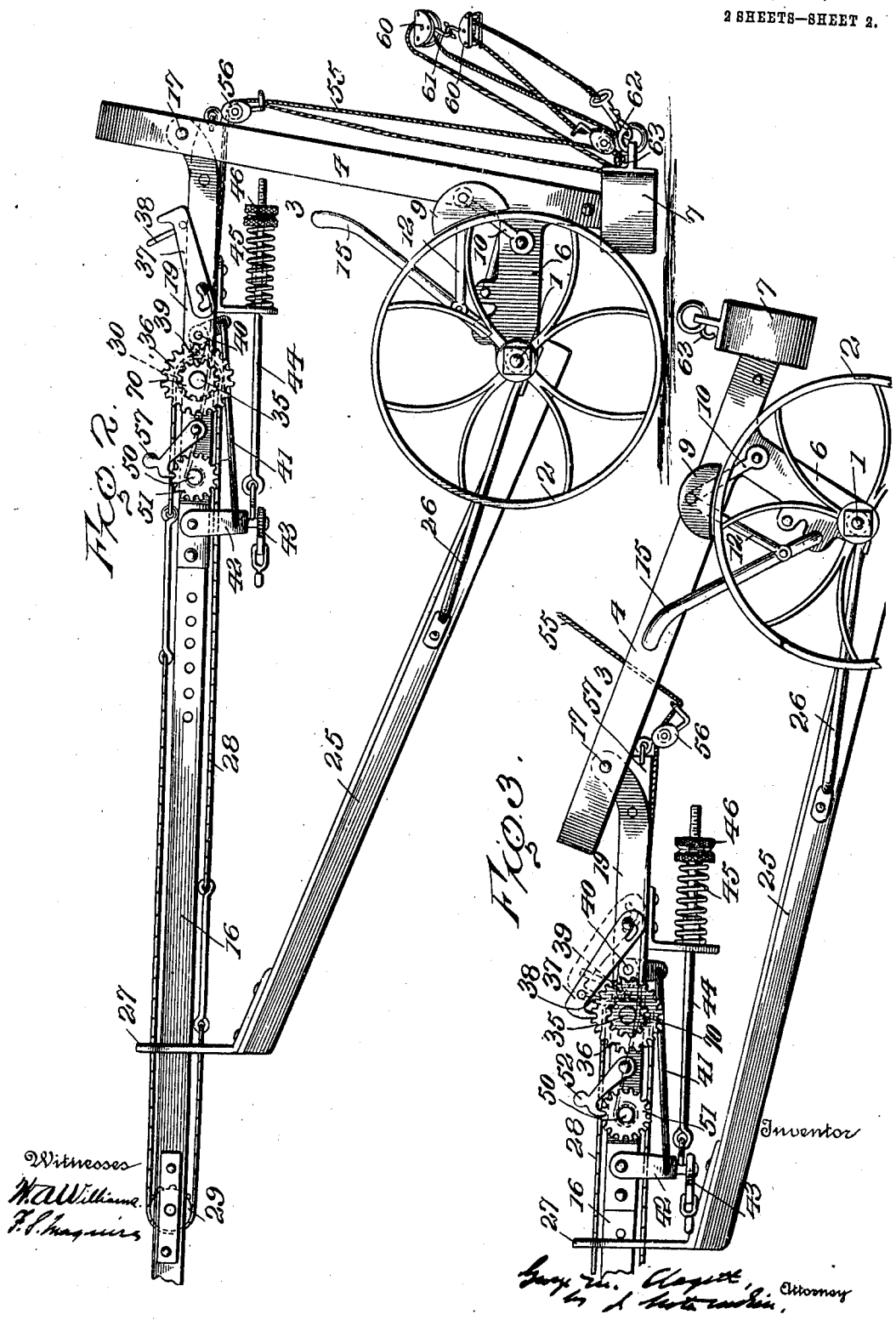

UNITED STATES PATENT OFFICE.

GEORGE M. CLAGETT, OF MARLBORO, MARYLAND.

SHOCK-CONVEYING MACHINE.

970,304.

Specification of Letters Patent. Patented Sept. 13, 1910.

Application filed March 31, 1910. Serial No. 552,635.

*To all whom it may concern:*

Be it known that I, GEORGE M. CLAGETT, of Marlboro, in the county of Prince George and State of Maryland, have invented certain new and useful Improvements in Shock-Conveying Machines; and I do hereby declare the following to be a full, clear, and exact description of the invention, such as will enable others skilled in the art to which it appertains to make and use the same.

The primary object of this invention is to provide a simple and highly efficient machine for readily and easily lifting, transporting, dumping and ricking shocks of fodder and corn.

A further object is to enable the center of gravity of the load to be readily and easily placed above or forward of the axle, and also to automatically lock the load when in such position.

A further object is to enable the base of each shock to be drawn inwardly and made compact to facilitate the loading and cause it to occupy less space on the machine. And a further object is to enable the load to be dumped without possible injury to the horses.

The invention will be hereinafter fully set forth and particularly pointed out in the claims.

In the accompanying drawings, Figure 1 is a view in perspective showing the machine in position to have a shock secured thereto. Fig. 2 is a similar view in side elevation. Fig. 3 is a side view showing the shock supporting frame in its raised and forward position. Fig. 4 is a perspective view of the crank handle for operating one of the shafts.

Referring to the drawings, 1 designates the axle and 2 the carrying wheels loose thereon.

3 is a normally upright frame composed of two side bars 4 and an upper cross bar 5, said side bars at their lower ends having forwardly projecting arms 6 which are journaled on the axle, preferably at points near the carrying wheels. This frame at its lower end carries a bar 7 in close proximity to the ground. This bar is shown as curved throughout its length, transversely of the machine, and as having rearwardly projecting fingers 8. The brake shoes 9 are shown as mounted on pivoted arms 10 which are connected by links 12 to the crank arms of a cross shaft 13 supported by bearings 14. One of the crank arms is elongated into a handle 15 for controlling the brakes.

16 designates the draft pole which I have shown as pivotally connected at 17 to the cross bar of frame 3, and to this pole is secured an approximately horizontal frame 18 which is shown as having two side bars 19 which are pivotally connected at their rear ends to the sides of frame 3. The frame 18 is fixedly secured to the draft pole, but both it and the pole are pivotally connected to the normally upright frame 3, and the latter is hung on the axle. In consequence, allowing that the brakes have been applied any forward pull on the upper end of frame 3 will cause it to rise, turning on its pivotal connections to the axle and move forward above the latter at a greater speed than the forward travel of the carrying wheels. It is the purpose of my invention to secure this raising and forward movement of the frame after a shock has been secured thereto, and to limit the forward movement when the center of gravity of the load is above or immediately forward of the axle. By this means the strain of the load is not on the shoulders of the team. The desired result may be brought about in various ways. I prefer to employ means which will be automatic in arresting the forward movement of the load when the center of gravity is above the axle, but this is not absolutely necessary.

According to the means shown for preventing the frame from being pulled over too far and falling forward with the load, a bar 25 is arranged longitudinally of the machine and in vertical line with the draft pole. This bar is shown as fixedly connected at its rear end to the axle, at the center thereof, and also to near the ends of the axle by divergent braces 26. At its forward end it has an eye plate 27 which forms a sliding connection between the bar and the draft pole, and to this is connected an endless chain 28 which is passed around sprocket wheels 29 and 30 journaled in openings in the draft pole. This endless chain allows of a relative movement between the draft pole and the bar, and through the latter a relative movement between the frame and the axle. In other words, in raising a shock the brakes are first applied, and as the horses pull forwardly on the draft pole the frame will be raised and moved forward above the axle. This forward movement should be arrested when the center of gravity is above or forward of the axle. For this purpose a stop pin 31 may be projected through any one of a series of holes 32 extending transversely through the draft pole, and upon the eye plate engaging such stop the forward movement of the frame and load relatively to the axle will be arrested. A second stop 33 may be positioned in front of the eye plate to prevent any possibility of the lowering of the shock-supporting frame. While the stop pin may serve every necessary purpose, yet the same result may be secured by directly locking the endless chain, and preferably this is designed to be effected automatically. For this purpose the sprocket wheel 30 is carried by a shaft 35 supported at its outer end by one of the side bars of frame 18, and with a ratchet wheel 36 on such shaft is designed to engage a pawl 37 which carries a depending pin 38. With this pin is designed to engage an arm 39 of a crank shaft 40, which crank shaft is connected by a rod 41 to a pivoted support 42 for the whiffletree 43. To this whiffletree support is connected a spring-held rod 44, the tension of the spring 45 of which may be regulated by a nut 46. When the horses begin to pull, the forward movement of the whiffletree support will rock crank shaft 40, and the arm 39 thereof, by engaging pin 38, will raise pawl 37 from engagement with ratchet 36 and so hold it as long as the pull of the horses on the whiffletree overcome the tension of spring 45. When the load has been raised above the center of gravity there is, momentarily at least, a slight relaxation on the pull of the horses on the whiffletree, with the result that the recoil of spring 45 will immediately allow crank shaft 40 to resume its normal position and permit pawl 37 to engage ratchet 39. This will lock shaft 35, and hence hold the draft pole and bar 25 in fixed relation and prevent further forward or backward movement of the shock supporting frame. To prevent arm 39 from again raising pawl 37, the latter is provided with a bayonet slot 47 through which its pivot projects, the vertical portion of the slot being at the rear. When the pawl is allowed to engage the ratchet it is, by the latter, moved forward until arrested by the engagement with the pivot of the wall at the rear end of the slot. Thereupon, the pawl will lower at its pivoted end, with the pivot projecting through the vertical portion of the slot. In this way the pawl is locked and its pin 38 is beyond the plane of arm 39. Before loading the machine, the pawl is always moved longitudinally so that its pin 38 may be engaged by arm 39 in raising a load.

50 designates a rotatable shaft supported by the draft pole and frame bars 19, and having a ratchet 51 with which a pawl 52 engages. This shaft is designed to be turned by a crank handle 53 carrying a pawl 54 which also engages with the ratchet. To this shaft are secured two ropes 55 which are passed over two rollers or pulleys 56 suspended from a bar 57 at the rear end of the draft pole, and the ends of these ropes are preferably secured to the opposite ends of supporting bar 7. On each rope is a block 60 having a pivoted hook 61 whereby the two blocks may be connected together. By passing the rope around the shock near the base thereof, and connecting these blocks, such base may be made compact, and by connecting the ropes to the supporting bar 7 the line of pull, when shaft 50 is rotated, is approximately at right angles to the rear side of the shock. For this purpose there is placed on each rope a small block 62 which is designed to be held to bar 7 by hooks 63 near the ends thereof. The tightening of the rope when blocks 62 are connected to bar 7 will draw the rope around the base at practically right angles to the shock. After the base has been compacted the blocks 62 are disconnected from bar 7, and by further rotating shaft 50 the shock will be tightly secured to the frame.

In practice, the machine is backed up to the shock, the pulleys are connected, and the ropes are carried to the back of the shock and then tightened to compact the base. The shock being thus held to the vertical frame 3 and in part supported by bar 7, the load is ready to be elevated or raised to an approximately horizontal position. To bring this about the operator presses downwardly on the brake lever, and the horses are driven forward until the sliding of the pole through the eye-plate in the connecting bar 25 is arrested either by engagement with stop pin 31 or by the locking of shaft 35, if the automatic means be employed. In other words, after the load has been lifted so as to place the center of gravity above the axle, the slight relaxation of the pull on the whiffletree, will, under the recoil of spring 45, and the rocking of shaft 40, permit the retaining pawl 37 to engage ratchet 36. The load may thus be transported without injury to the horses' shoulders. After the destination has been reached either the forward pin 33 is removed or the pawl 37 is disengaged from ratchet 36, and the frame with the load is forced back to its original upright position. This is effected by turning shaft 35, and for this purpose the latter is provided with a ratchet 70 with which the pawl of the crank handle 53 is designed to engage. While I preferably use a single crank handle for operating the two shafts 35 and 50, yet, if preferred, a separate crank handle may be employed for each shaft. When the ropes are released, by turning shaft 50, the fodder or corn will be left standing as the machine is drawn away. Any number of shocks may be set up, one against the other, in long rows or ricks.

The advantages of my invention will be apparent to those skilled in the art. I have not undertaken to show and describe the various forms of mechanism that may be employed for carrying out the invention, but it will be understood that the latter is not restricted to any special form of mechanism. Although I prefer to secure the raising of the load by locking the frame to the carrying wheels, yet it is manifest that the frame may be raised by other means.

I claim as my invention:—

1. A shock-conveying machine comprising an axle, carrying wheels thereon, a frame normally upright in rear of the axle and connected thereto, means for securing shocks to such frame, and means for moving the frame concentrically to said axle, as the machine travels forward, to place the center of gravity of the load above or forward of the axle.

2. A shock-conveying machine comprising an axle, carrying wheels thereon, a frame normally upright in rear of the axle and movable concentrically thereto, means for securing shocks to such frame, means for causing the frame with the load to rise and travel forward as the machine is moved forward, and means for limiting the forward travel of the frame relatively to the axle.

3. A shock-conveying machine comprising an axle, carrying wheels thereon, a frame pivotally hung in relation to said axle and normally upright in rear thereof, means carried by the frame for engaging the carrying wheels to cause the frame to travel with the carrying wheels and to place the center of gravity of the frame above or forward of the axle, and means for limiting the forward movement of the frame.

4. A shock-conveying machine comprising an axle, carrying wheels thereon, a frame normally upright in rear of the axle and connected thereto, means for securing shocks to such frame, means for causing the frame with the load to rise and travel forward as the machine is moved forward, and means for automatically limiting the forward travel of the frame relatively to the axle.

5. A shock conveying machine comprising an axle, carrying wheels thereon, a frame normally upright in rear of the axle and connected thereto, means for securing shocks to such frame, means for causing the frame with the load to rise and travel forward as the machine is moved forward, and means for variably limiting the forward travel of the frame relatively to the axle.

6. A shock conveying machine comprising an axle, carrying wheels thereon, a frame normally upright in rear of the axle and connected thereto, means for securing shocks to such frame, a draft pole connected to the top of said frame, means slidably connecting said axle to the draft pole, said frame with the load being caused to move upward and forward above the axle by the forward pull on the draft pole, and means for arresting the movement of the draft pole relatively to said sliding connection after the center of gravity has been moved above or forward of the axle.

7. A shock-conveying machine comprising an axle, carrying wheels thereon, a frame normally upright in rear of the axle and connected thereto, means for securing shocks to such frame, a draft pole connected to the top of said frame, and means slidably connecting said axle to the draft pole, said frame with the load being caused to move upward and forward above the axle by the forward pull on the draft pole, and variable means for arresting the movement of the draft pole relatively to said sliding connection after the center of gravity has been moved above or forward of the axle.

8. The combination with carrying wheels and an axle therefor, of a normally upright frame pivotally hung on said axle, means for securing shocks to said frame, means carried by such frame for locking it to said wheels to cause it, together with its load, to move with the wheels and relatively to the axle until the center of gravity of the load is above or forward of the axle, a draft pole secured to said frame, a bar secured to said axle, a sliding connection between said bar and draft pole, and means for holding said bar and draft pole in fixed relation to each other.

9. The combination with carrying wheels and an axle therefor, of a normally upright frame pivotally hung on said axle, means for securing shocks to said frame, means carried by such frame for locking it to said wheels to cause it, together with its load, to move with the wheels and relatively to the axle until the center of gravity of the load is above or forward of the axle, a draft pole secured to said frame, a bar secured to said axle, an endless chain carried by said draft pole and connected to said bar, a shaft operated by said chain, means for locking said shaft, and means for automatically releasing said lock until the center of gravity has been thrown forward or above the axle.

10. The combination with carrying wheels and an axle therefor, of a normally upright frame pivotally hung on said axle, means for securing shocks to said frame, means carried by such frame for locking it to said wheels to cause it, together with its load, to move with the wheels and relatively to the axle until the center of gravity of the load is above or forward of the axle, a draft pole secured to said frame, a bar secured to said axle, an endless chain carried by said draft pole and connected to said bar, a shaft operated by said chain, means for locking said shaft, and means actuated by the draft of the horses in the raising of the frame and its load for releasing said lock until the center of gravity has been moved to a point above or forward of the axle.

11. The combination with an axle, and carrying wheels thereon, of a normally upright frame in rear of the axle, and pivotally mounted thereon, means for locking the frame to the carrying wheels, a draft pole secured to said frame, a bar secured to said axle having an eye-plate slidable on said pole, an endless chain mounted on said pole and secured to said bar, a shaft actuated by said chain, a ratchet on said shaft, and a pawl for engaging said ratchet.

12. The combination with an axle, and carrying wheels thereon, of a normally upright frame in rear of the axle, and pivotally mounted thereon, means for locking the frame to the carrying wheels, a draft pole secured to said frame, a bar secured to said axle having an eye-plate slidable on said pole, an endless chain mounted on said pole and secured to said bar, a shaft actuated by said chain, a ratchet on said shaft, a pawl for engaging said ratchet and having a pin depending therefrom, a crank shaft having an arm designed to engage said pin for holding said pawl out of engagement with said ratchet, a whiffle-tree, and means connecting the latter to said crank-shaft for disengaging said pawl in the movement of the frame while locked to said wheels.

13. The combination with an axle, and carrying wheels thereon, of a normally upright frame in rear of the axle, and pivotally mounted thereon, means for locking the frame to the carrying wheels, a draft pole secured to said frame, a bar secured to said axle having an eye-plate slidable on said pole, an endless chain mounted on said pole and secured to said bar, a shaft actuated by said chain, a ratchet on said shaft, a pawl for engaging said ratchet and having a pin depending therefrom, a crank shaft having an arm designed to engage said pin for holding said pawl out of engagement with said ratchet, a whiffle-tree, a movable bearing therefor, a spring-held rod secured to said bearing, and means connecting said bearing to said crank shaft for disengaging the pawl in the movement of the frame while locked to said wheels.

14. The combination with an axle, and carrying wheels thereon, of a normally upright frame in rear of the axle, and pivotally mounted thereon, means for locking the frame to the carrying wheels, a draft pole secured to said frame, a bar secured to said axle having an eye-plate slidable on said pole, an endless chain mounted on said pole and secured to said bar, a shaft actuated by said chain, a ratchet on said shaft, a pawl for engaging said ratchet and having a pin depending therefrom, a crank shaft having an arm designed to engage said pin for holding said pawl out of engagement with said ratchet, a whiffletree, and means connecting the latter to said crank shaft for disengaging said pawl in the movement of the frame while locked to said wheels, said pawl being capable of moving longitudinally, upon reengaging its ratchet, to move said pin out of the plane of movement of said arm.

15. A shock-conveyer comprising a normally upright frame, a transversely extended bar at the lower end thereof, a winding shaft, ropes thereon, said ropes being secured at their outer ends to said bar, and blocks on said ropes having connecting hooks.

16. A shock-conveyer comprising a normally upright frame, a transversely extended bar at the lower end thereof, a winding shaft, ropes thereon, said ropes being secured at their outer ends to said bar, blocks on said ropes having connecting hooks, and a second block on each rope designed to be secured to said bar near the ends thereof for initially compacting the base of the shocks.

In testimony whereof, I have signed this specification in the presence of two subscribing witnesses.

GEORGE M. CLAGETT.

Witnesses:
JOHN A. MURPHY,
FRANK KELLAM.